United States Patent [19]

Sturdevant et al.

[11] Patent Number: 5,439,747
[45] Date of Patent: Aug. 8, 1995

[54] ANODIZED ALUMINUM HAVING PROTECTIVE COATING

[75] Inventors: Shelley D. Sturdevant; Edward T. Ryan, both of Cheswick; Bruce A. Connelly, Gibsonia, all of Pa.

[73] Assignee: PPG Industries, Inc., Pittsburgh, Pa.

[21] Appl. No.: 156,350

[22] Filed: Nov. 22, 1993

Related U.S. Application Data

[62] Division of Ser. No. 34,936, Mar. 19, 1993, abandoned.

[51] Int. Cl.⁶ ........................ B32B 15/08; B32B 15/20
[52] U.S. Cl. .................................... 428/447; 428/450; 525/443; 525/446; 525/106; 427/387; 427/388.1
[58] Field of Search ...................... 525/443, 446, 106; 427/387, 388.1; 428/447, 450

[56] References Cited

U.S. PATENT DOCUMENTS

| | | | |
|---|---|---|---|
| 3,994,851 | 11/1976 | Chang | 525/443 |
| 4,330,446 | 5/1982 | Miyosawa | 523/409 |
| 4,713,410 | 12/1987 | Katchko et al. | 524/500 |
| 4,879,345 | 11/1989 | Connelly et al. | 525/104 |

FOREIGN PATENT DOCUMENTS 0461537 12/1991 European Pat. Off.
3006274 11/1991 Japan.

OTHER PUBLICATIONS

Sterman, S. et al. "Theory of Mechanisms of Silane Coupling Agents in Glass Reinforced and Filled Thermoplastic and Thermosetting Resin Systems" pp. 1–25.
Patent Abstracts of Japan, vol. 17, No. 79 (C-1027) (5708) 17 Feb. 1993 & JP,A,04 279 675 (Sumitomo Cement KK).
Union Carbide Organo-silicon brochure, pp. 1–29, no date available.
Barry Arkles, "Tailoring Surfaces with Silanes," CHEMTECH, Dec. 1977, vol. 7, pp. 766–778.
Edwin P. Plueddemann, "Silane Adhesion Promoters in Coatings," Progress in Organic Coatings, 11 (1983), pp. 297–308.
F. Walker, "Organosilanes as Adhesion Promoters," J. Adhesion Sci. Technol., vol. 5, No. 4, 1991, pp. 279–305.

Primary Examiner—John C. Bleutge
Assistant Examiner—Margaret W. Glass
Attorney, Agent, or Firm—Paul S. Chirgott; Dennis G. Millman

[57] ABSTRACT

A coating composition and method for protecting anodized aluminum, and the coated product are disclosed, wherein the coating comprises a crosslinking agent; a film-forming resin selected from the group consisting of polyester polymers, thermosetting acrylic polymers, and mixtures thereof; and an epoxy silane. The combination provides exceptional adhesion of the coating to anodized surfaces as well as good hardness.

16 Claims, No Drawings

ANODIZED ALUMINUM HAVING PROTECTIVE COATING

This application is a division of application Ser. No. 08/034,936, filed Mar. 19, 1993, now abandoned.

BACKGROUND OF THE INVENTION

This invention is directed to improving the appearance of anodized aluminum and protecting it from corrosion and stains. It had previously been proposed to protect anodized aluminum by means of a clear coating, but the performance of prior art coatings has not been as good as desired, particularly with regard to adhesion. It is believed that anodizing tends to seal the surface irregularities of an aluminum surface, thereby making it more difficult for a subsequently applied coating to adhere. As a result, prior art clear coatings on anodized aluminum have typically failed in relatively short periods of time by chipping and peeling, which not only leaves the anodized layer exposed to corrosion, but also produces an unattractive appearance. Furthermore, clear coatings in general present a more difficult problem with respect to adhesion because pigments in colored coatings tend to have a beneficial effect on adhesion.

It has been proposed to apply clear protective coatings onto anodized aluminum surfaces by electrodeposition, which may improve adhesion. However, it would be desirable to avoid the expense and complication of electrodeposition. Therefore, this invention is directed toward providing clear coatings on anodized aluminum that may be applied by spraying or other conventional application techniques other than by electrodeposition.

Coatings based on a variety of film-forming resin systems are generally considered appropriate for coating aluminum surfaces, including alkyds, polyesters, silicone-polyesters, thermoplastic acrylics, thermosetting acrylics, and fluoropolymers. When used on anodized aluminum surfaces, however, most of these conventional coating compositions do not exhibit the desired degree of adhesion to the anodized surface.

There are many additives commercially available that are claimed to improve the adhesion of coatings. However, these additives are not effective in all compositions and on all substrates. The difficulty in attaining adequate adhesion to anodized aluminum has not heretofore been adequately overcome merely by adding adhesion promoters to the conventional aluminum coating compositions. Products promoted as having adhesion promoting properties include a variety of chemical compounds, included among which are several broad categories of silane compounds such as vinyl silanes, acryloxy silanes, amino silanes, mercapto silanes, and epoxy silanes. Each of these categories has a number of commercially available species, and many more species are theoretically possible. Amino silanes in particular have been suggested in the prior art for coatings of this type, but have been found by the present inventors to be of limited effectiveness on anodized aluminum.

U.S. Pat. No. 4,879,345 (Connelly et al.) discloses coating compositions adapted for enhanced adherence to glass. Although unpigmented compositions are mentioned, the primary purpose of these coatings is to add colored coatings to glass, and therefore would be pigmented. The resin system is a blend of fluoropolymer and thermoplastic acrylic. A broad class of functional organosilanes are disclosed as adhesion promoting additives for the compositions of that patent. Fluoropolymer based coatings tend to be relatively soft and subject to marring. It would be desirable for the clear coatings for anodized aluminum of the present invention to achieve both adhesion and hardness.

SUMMARY OF THE INVENTION

It has now been discovered that a particular group of coating compositions, when combined with a particular class of, silanes, yield exceptionally good adhesion to anodized aluminum. The silanes that have been found effective in this combination are epoxy silanes. The coating compositions in which the epoxy silanes have been found effective are those whose film-forming resin comprises either polyester polymers, thermosetting acrylic polymers, or mixtures thereof. This combination has also been found to exhibit good hardness in the cured coatings. Compositions containing thermosetting acrylic polymers have been found to be preferred for producing an excellent combination of both adhesion and hardness, particularly when the acrylic polymer is an acrylic/acrylamide copolymer.

DETAILED DESCRIPTION OF THE INVENTION

The silanes of interest as adhesion promoters are organofunctional silanes having the following structural formula:

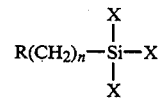

where R represents a reactive group selected from vinyl, acryloxy, amino, mercapto, or epoxy, n is 1 to 10, and X represents a readily hydrolyzable group such as Cl, $OCH_3$, $OC_2H_5$ or $OC_2H_4OCH_3$. Of interest in the present invention are those organofunctional silanes in which R is an epoxy terminated group. Commercially available examples of epoxy silanes are gamma-glycidoxypropyltrimethoxysilane and beta-(3,4-epoxycyclohexyl)-ethyltrimethoxysilane, but it should be understood that the invention is not limited to these specific examples.

As the film-former In the coating compositions of the present invention, there can be employed resins selected from the group consisting of polyester polymers, thermosetting acrylic polymers, and mixtures thereof. In accordance with this invention, the film-forming resin is conducive to the formation of a clear coating. By the term "clear" is meant that the coating is free of noticeable haze and yellowing following thermal curing.

An illustrative example of the thermosetting acrylic resin can be an acrylic polymer which can be prepared by free radical addition polymerization of ethylenically unsaturated acrylic monomers. Examples of acrylic monomers include methyl acrylate, methyl methacrylate, butyl acrylate, butyl methacrylate, styrene, N-ethoxymethyl acrylamide, and N-butoxymethyl acrylamide. Other monomers known for use in acrylic polymerization may be used instead of or in addition to these examples. Small amounts of acid group containing monomers may also be included in the polymerization of the acrylic polymer, such as acrylic acid or methacrylic acid.

Inclusion of N-ethoxymethyl acrylamide or N-butoxymethyl acrylamide or the like in the polymerization of the acrylic polymer described above may serve as an internal crosslinking agent for curing the polymer. It is preferred to additionally include in the acrylic polymer based compositions an external crosslinking agent such as substituted or unsubstituted melamine, benzoguanamine, urea, isocyanate, or amides. Particularly suitable are partially or wholly methoxy or butoxy substituted melamines, e.g., hexamethoxymethyl melamine. Other examples of crosslinking agents include partially methylated melamine formaldehyde resin, methylated ureas, isocyanates, isocyanurates, and biurets. The crosslinking agent is employed in an amount sufficient to provide an effectively cured coating. By "effectively cured coating" is meant that the coating is hard (greater than "H" pencil hardness), and does not blush or haze upon exposure to water. Typically, the crosslinking agent is employed in an amount of about 5 to 50 weight percent and preferably about 10 to 35 weight percent based on resin solids.

The polyester resins of interest as the film-forming resins of the present invention may be characterized as the reaction product of one or more polyacid and one or more polyol. A wide range of polyacids and polyols as are known in the art for producing polyester resins for coatings may be used. The most commonly used polyacids are adipic acid and phthalic acid (as well as phthalic anhydride). Unsaturated acids such as fumaric and maleic (and its anhydride) may be used, although the polyesters used in the present invention are preferably saturated polyesters. Other polyacids include malonic acid, succinic acid, glutaric acid, pimelic acid, and sorbic acid. Polyols most commonly used are ethylene glycol, propylene glycol, diethylene glycol, dipropylene glycol, 1,3-butylene glycol, neopentyl glycol, trimethylpentandiol, and pentaerythritol. The polyester may also be modified with naturally occurring or synthetic fatty acids such as coconut fatty acid, linseed fatty acid and castor oil fatty acids. A curing agent such as a melamine or one or more of the other external curing agents previously disclosed is typically included in the polyester based resins.

In addition to the primary film-forming acrylic or polyester resins, the compositions of the present inventions may include other modifying or diluent resins. These may be reactive or non-reactive. If reactive, curing agents may be included to crosslink the additive resins, whereby they participate in film forming. Other additives such as flow control agents, rheology modifiers, and anti-foaming agents may be included in the compositions of the present invention.

Resin A

The following is an example of an acrylic polymer that is useful as a film former in the preparation of the coating composition of this invention. The acrylic polymer was prepared by free radical initiated addition polymerization using the following:

| Ingredients | Parts by Weight |
| --- | --- |
| Xylene | 8998 |
| N-butoxymethylacrylamide | 3712 |
| Ethyl acrylate | 8230 |
| Styrene | 8140 |
| Methacrylic acid | 495 |
| Tertiary dodecyl mercaptan (TDM) | 251 |
| "VAZO 64" Catalyst | 205 |

-continued

| Ingredients | Parts by Weight |
| --- | --- |
| N-butanol | 2589 |
| "AROMATIC 150" solvent from Exxon | 13490 |
| T-butyl perbenzoate | 65 |

The resultant polymer having 52 percent solids was employed in the coating compositions of this invention as described herein.

Resin B

The following is an example of a polyester modifying resin that may be blended with acrylic Resin A in some embodiments of the invention. The polyester polymer was prepared by condensation polymerization using the following:

| Ingredients | Parts by Weight |
| --- | --- |
| Synthetic fatty acids[1] | 2800 |
| Pentaerythritol | 1350 |
| Propylene glycol | 1250 |
| Phthalic anhydride | 2925 |
| Xylene | 3104 |

(1) "EMFAC 1207" from Emery Chemical Co.

Resin C

This example illustrates the condensation polymerization of a polyester polymer that was used in the preparation of a coating in this invention.

| Ingredients | Parts by Weight |
| --- | --- |
| Trimethyl pentanediol | 2454 |
| Adipic acid | 667 |
| Isophthalic acid | 929 |
| Dibutyl tin oxide | 4 |
| "AROMATIC 100" solvent from Exxon | 409 |

This resin was polymerized to an acid value of 8.3 and a hydroxyl value of 179.

In the following series of examples, several types of coating compositions, with and without epoxy silane, were tested for adhesion on anodized aluminum. The test substrate in each example was unsealed gold anodized aluminum produced by Columbia Pacific Aluminum Co. The results of the comparative tests are shown in Table 1. Throughout the following examples, parts by weight are based on resin solids content of the ingredients.

EXAMPLE 1

A silicone modified polyester clear coating being marketed by a competitor as a coating for anodized aluminum was spray applied onto an anodized aluminum substrate and baked for 10 minutes at 350° F. (177° C.). No epoxy silane was added to this product.

EXAMPLE 2

A silicone modified polyester sold by PPG Industries, Inc., under the name POLY-SI ® was prepared from the following ingredients:

| Ingredients | Parts by Weight |
| --- | --- |
| Silicon polyester[1] | 66 |
| Methylated melamine[2] | 34 |

-continued

| Ingredients | Parts by Weight |
| --- | --- |
| Catalyst[3] | 1 |

(1) 50% silicone and 50% polyester derived from neopentyl glycol, 1,6-hexanediol, and hexahydrophthalic anhydride.
(2) "CYMEL 303" from American Cyanamid.
(3) "NACURE 2501" blocked para-toluene sulfonic acid.

After being spray applied onto anodized aluminum, the coating was baked for 13 minutes at 350° F. (177° C.). to yield a clear film.

EXAMPLE 2A

In accordance with the present invention 5.6 parts by weight of gamma-glycidoxypropyltrimethoxysilane available from Union Carbide under the name "A-187" was added to the composition of Example 2. The coating was spray applied and cured in the same manner as described in Example 2.

EXAMPLE 3

A coating composition sold by PPG Industries, Inc., under the name "Durabrite C" for coating metal coil, based on reactive fluoropolymer resin was prepared as follows in xylene solvent:

| Ingredients | Parts by Weight |
| --- | --- |
| Polychlorotrifluoroethylene vinyl ether copolymer[1] | 61.3 |
| Isophorone diisocyanate adduct | 31.2 |
| Aliphatic epoxy | 2.8 |
| "IONOL" antioxidant | 2.0 |
| U. V. absorber[2] | 2.58 |

(1) "LUMIFLON 502" from Asahi Glass Co.
(2) "TINUVIN 1130" from Ciba-Geigy.

After being spray applied onto anodized aluminum, the coating was baked for 7 minutes at 350° F. (177° C.). to yield a clear film.

EXAMPLE 4

"Lumiflon 400" polychlorotrifluoroethylene vinyl ether copolymer reactive fluoropolymer resin from Asahi Glass Co. After being spray applied onto anodized aluminum, the coating was baked for 10 minutes at 350° F. (177° C.). to yield a clear film.

EXAMPLE 4A

To 95 parts of the composition of Example 4 was added 5 parts "A-187" gamma glycidoxypropyltrimethoxysilane from Union Carbide. The coating was spray applied and cured in the same manner as Example 4.

EXAMPLE 5

A fluoropolymer based coating composition commonly used for application onto aluminum architectural components was prepared as follows.

| Ingredients | Parts by Weight |
| --- | --- |
| Polyvinylidene fluoride[1] | 70 |
| Acrylic resin[2] | 25 |

(1) HYLAR 5000 from Atochem.
(2) ACRYLOID B-44 acrylic resin containing ethyl acrylate and methyl methacrylate from Rohm & Haas.

The above ingredients were blended in the above-listed order, diluted with solvent to 35 percent solids, and spray applied. The applied coating was cured thermally for 13 minutes at 475° F. (246° C.) to give a hard, glossy film, clear in color.

EXAMPLE 5A

In accordance with the present invention 5 parts by weight of gamma-glycidoxypropyltrimethoxysilane available from Union Carbide under the name "A-187" was added to the composition of Example 5. The coating was spray applied and cured in the same manner as described in Example 5.

EXAMPLE 6

A polyester based coating composition commonly used for application onto metals was prepared as follows:

| Ingredients | Parts by Weight |
| --- | --- |
| Polyester Resin C | 51 |
| Melamine resin[1] | 41 |
| Epoxy resin[2] | 3 |

(1) CYMEL ® 303 from American Cyanamid.
(2) EPON ® 1001 from Shell Chemical Co.

The above ingredients were blended in the above-listed order, diluted with solvent to 73 percent solids (V.O.C.=2.3 pounds per gallon) and spray applied. The applied coating was cured thermally for 13 minutes at 350° F. (177° C.) to give a hard, glossy film.

EXAMPLE 6A

In accordance with the present invention 5 parts by weight of gamma-glycidoxypropyltrimethoxysilane available from Union Carbide under the name "A-187" was added to the composition of Example 6. The coating was spray applied and cured in the same manner as described in Example 6.

EXAMPLE 7

An acrylic-based coating composition commonly used for application onto metals was prepared as follows:

| Ingredients | Parts by Weight |
| --- | --- |
| Acrylic Resin A | 32 |
| Polyester Resin B | 35 |
| Melamine resin[1] | 21 |
| EPON ® 1001 Epoxy[2] | 6 |
| Para-toluene sulfonic acid catalyst | 1 |

(1) "CYMEL ® 303" hexamethoxymethyl melamine available from American Cyanamid.
(2) Available from Shell Chemical.

The above ingredients were blended in the above-listed order, diluted with solvent to 35 percent solids. The applied coating was cured thermally for 13 minutes at 350° F. (177° C.) to give a clear, hard and glossy film.

EXAMPLE 7A

In accordance with the present invention 5 parts by weight of gamma-glycidoxypropyltrimethoxysilane available from Union Carbide under the name "A-187" was added to the composition of Example 7. The coating was spray applied and cured in the same manner as described in Example 7.

Each of the foregoing examples was tested for hardness and adhesion in accordance with the following procedures, and the results are reported in Table 1.

The pencil hardness tests were conducted in accordance with ASTM D 3363. Wood was stripped from pencil of varying hardness, leaving the full diameter of lead exposed to a length of ¼ inch to ⅜ inch. The end of the lead was flattened at 90 degrees to the pencils axis, and holding the pencil at 45 degrees to the film surface, the pencil is pushed forward about ¼ inch using as much downward pressure as can be applied without breaking the lead. The result is reported as the highest pencil hardness that produced no rupture of the film.

The tape is sharply pulled off at a right angle to the coated surface. Passing the test entails no loss of adhesion of the coating to the metal, no blistering, and no significant visual change in appearance.

Resistance to mar is tested by rubbing a wooden tongue depressor at 45 degree angle back and forth five times on the coated surface. If no marking of the coated surface results, the performance is rated "good". If deep grooves are produced, the performance is rated "poor".

TABLE 1

| Example | 1 Competitor Silicone Polyester | 2 "Poly-Si" Silicone Polyester | 2A "Poly-Si" Silicone Polyester | 3 Fluoropolymer IPDI | 4 Fluoropolymer | 4A Fluoropolymer |
|---|---|---|---|---|---|---|
| Epoxy Silane | no | no | yes | no | no | yes |
| Pencil Hardness | F | 2H | 2H | H | HB | F |
| Gloss (%) | 95+ | 98+ | 98+ | 98+ | 75 | 82 |
| Dry Adhesion | slight peel-off | 100 | 100 | 100 | 100 | 100 |
| Boiling Water Adhesion (%) | 0 | 0 | 0 | 50 | 0 | 100 |
| 24 hr. Soak Adhesion (%) | 95 | 0 | 0 | 0 | 0 | 100 |
| Detergent Adhesion | Fail | Fail | Fail | Fail | Fail | Pass |
| Mar | Poor | Good | Good | Average to poor | Very Poor | Poor |

| Example | 5 Fluoropolymer Acrylic | 5A Fluoropolymer Acrylic | 6 Polyester | 6A Polyester | 7 Acrylic | 7A Acrylic |
|---|---|---|---|---|---|---|
| Epoxy Silane | no | yes | no | yes | no | yes |
| Pencil Hardness | F | F | 2H | 2H | 2H | 2H |
| Gloss (%) | 15 | 15 | 98+ | 98+ | 98+ | 98+ |
| Dry Adhesion | 100 | 100 | 100 | 100 | 100 | 100 |
| Boiling Water Adhesion (%) | 0 | 100 | 0 | 100 | 0 | 100 |
| 24 hr. Soak Adhesion (%) | 0 | 0 | 0 | 80 | 0 | 100 |
| Detergent Adhesion | Fail | Fail | Pass | Pass | Pass | Pass |
| Mar | Poor | Poor | Good | Good | Very Good | Very Good |

Gloss is measured in accordance with ASTM D 523 using a 60 degree gloss meter. Gloss is reported in terms of percent reflected light. Gloss values of 80 or higher are considered high gloss.

For the dry adhesion, boiling water adhesion, and 24 hour soak adhesion tests, the coating is scribed with eleven parallel cuts through the film 1/16 inch apart. Eleven similar cuts are made at 90 degrees to and crossing the first eleven cuts. Permacel 99 tape is applied over the area of cuts by pressing down firmly against the coating to eliminate voids and air pockets. Then the tape is sharply pulled off at a right angle to the plane of the coated surface. Adhesion is reported as the percentage of squares remaining on the substrate in the scribed area. For the boiling water test, the scribed sample is immersed in boiling water for 30 minutes, removed, wiped dry, and then the tape is applied immediately and pulled off as described above. In the water soak test, the sample is immersed in distilled or deionized water at 100° F. (38° C.) for 24 hours, removed and wiped dry, and the tape is applied and pulled off as described above.

Detergent resistance is tested by immersing the samples in a 2% detergent solution at 100° F. (38° C.) for 72 hours. The samples are removed and wiped dry. Permacel 99 tape ¾ inch wide is immediately applied along the entire length of the sample by pressing down firmly against the coating to eliminate voids and air pockets.

The following tests compare epoxy silane with other silanes in the same coating composition. The results are set forth in Table 2.

| Ingredients | Parts by Weight |
|---|---|
| Acrylic Resin A | 252.56 |
| EPON 1001 epoxy | 34.15 |
| CYMEL 303 melamine | 86.06 |
| Polyester Resin B | 201.79 |
| Para-toluene sulfonic acid catalyst | 10.17 |
| Dow-Corning "Silicone 200" flow additive | 0.50 |
| Silane | 19.46 |

The particular silanes used in the above composition were as follows:

EXAMPLE 8A

Gamma-aminopropyl triethoxysilane available as "A-1100" from Union Carbide.

EXAMPLE 8B

Gamma-aminopropyl trimethoxysilane available as "A-1110" from Union Carbide.

EXAMPLE 8C

Methyl trimethoxysilane available as "A-163" from Union Carbide.

EXAMPLE 8D

Gamma-glycidoxypropyltrimethoxysilane available as "A-187" from Union Carbide.

EXAMPLE 8E

No silane.

TABLE 2

| Example | Dry Adhesion (%) | Boiling Water Adhesion (%) |
| --- | --- | --- |
| 8A | 100 | 25 |
| 8B | 100 | 25 |
| 8C | 100 | 0 |
| 8D | 100 | 100 |
| 8E | 100 | 0 |

While illustrative embodiments of the invention have been described hereinabove, it will be understood that various modifications will be apparent to and can be made by those skilled in the art without departing from the scope or spirit of the invention as defined by the claims. Accordingly, it is intended that the claims be construed as encompassing all aspects of the invention which would be treated as equivalents by those skilled in the art to which the invention pertains.

We claim:

1. Anodized aluminum having a clear coating in which the coating comprises:
   the thermosetting reaction product of a crosslinking agent and a film-forming resin component consisting of a member selected from the group consisting of polyester polymers, thermosetting acrylic polymers, and mixtures thereof; and
   silane having the structure:

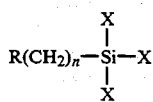

where R represents an epoxy terminated group, n is 1 to 10, and X represents a readily hydrolyzable group selected from the group consisting of: Cl, $OCH_3$, $OC_2H_5$, and $OC_2H_4OCH_3$.

2. The coated product of claim 1 wherein the film-forming resin includes a thermosetting acrylic polymer which is an acrylic/acrylamide copolymer.

3. The coated product of claim 2 wherein the acrylic/acrylamide copolymer is further characterized as a copolymer of ethyl acrylate, styrene, N-butoxymethyl acrylamide, and methacrylic acid.

4. The coated product of claim 3 further including polyester polymer as a modifying resin.

5. The coated product of claim 1 wherein the film-forming resin includes polyester further characterized as being the reaction product of trimethylpentanediol, adipic acid, and isophthalic acid.

6. The coated product of claim 1 wherein the crosslinking agent is melamine.

7. The coated product of claim 6 wherein the melamine is methoxylated melamine.

8. The coated product of claim 1 wherein the silane is selected from the group consisting of gamma-glycidoxypropyltrimethoxysilane and beta-(3,4-epoxycyclohexyl)-ethyltrimethoxysilane.

9. A method for protecting anodized aluminum comprising applying to the anodized surface a clear coating comprising:
   a crosslinking agent;
   a film-forming resin component consisting of a member selected from the group consisting of polyester polymers, thermosetting acrylic polymers, and mixtures thereof; and
   silane having the structure:

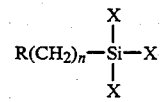

where R represents an epoxy terminated group, n is 1 to 10, and X represents a readily hydrolyzable group selected from the group consisting of: Cl, $OCH_3$, $OC_2H_5$, and $OC_2H_4OCH_3$.

10. The coated product of claim 9 wherein the film-forming resin includes a thermosetting acrylic polymer which is an acrylic/acrylamide copolymer.

11. The coated product of claim 10 wherein the acrylic/acrylamide copolymer is further characterized as a copolymer of ethyl acrylate, styrene, N-butoxymethyl acrylamide, and methacrylic acid.

12. The method of claim 11 further including polyester polymer as a modifying resin.

13. The method of claim 9 wherein the film-forming resin includes polyester further characterized as being the reaction product of trimethylpentanediol, adipic acid, and isophthalic acid.

14. The method claim 9 wherein the crosslinking agent is melamine.

15. The method of claim 14 wherein the melamine is methoxylated melamine.

16. The method of claim 9 wherein the silane is selected from the group consisting of gamma-glycidoxypropyltrimethoxysilane and beta-(3,4-epoxycyclohexyl)-ethyltrimethoxysilane.

* * * * *